Patented Aug. 5, 1952

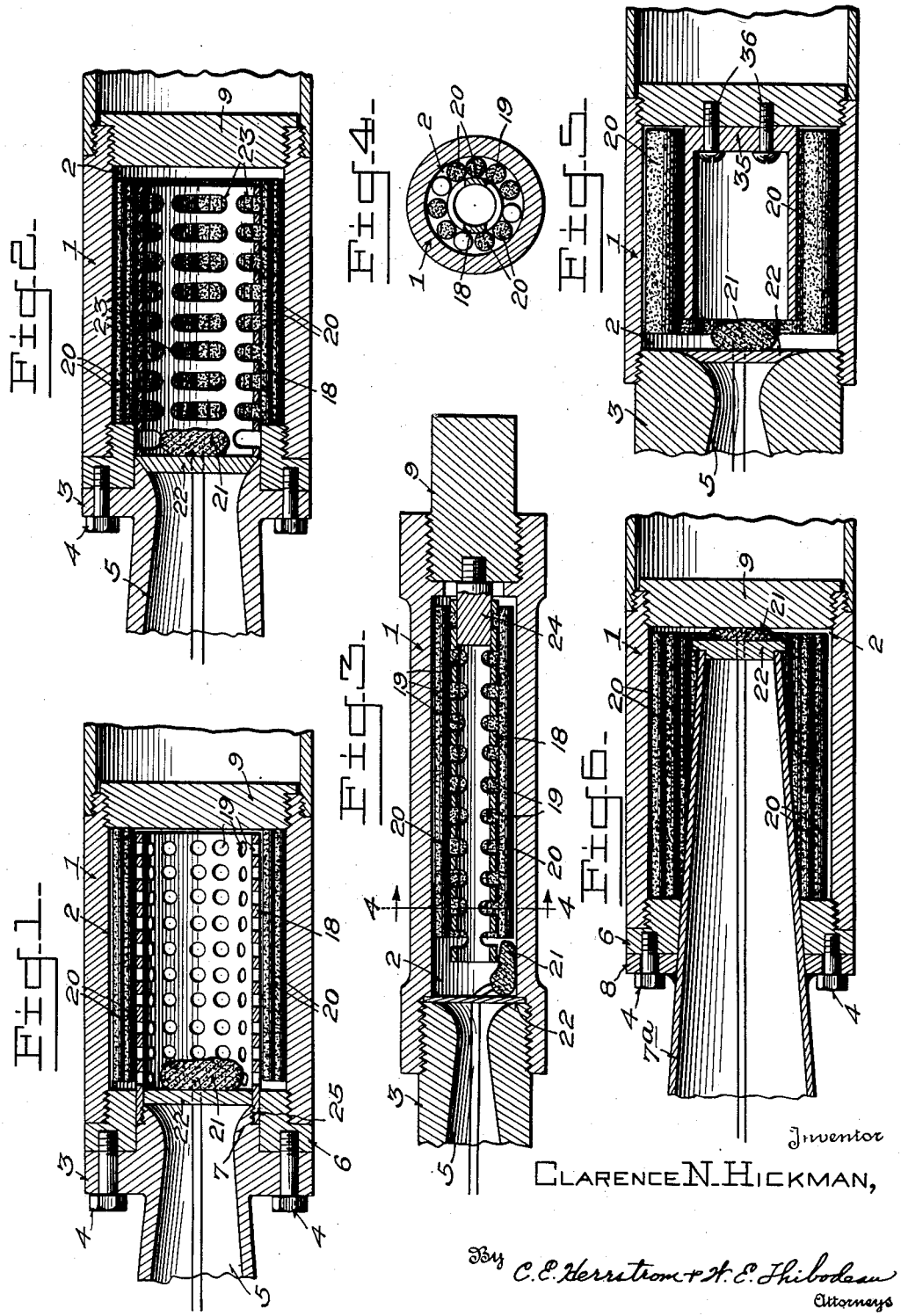

2,605,607

UNITED STATES PATENT OFFICE 2,605,607

TRAP FOR ROCKET PROPELLENT

Clarence N. Hickman, Jackson Heights, N. Y.,
assignor to the United States of America as
represented by the Secretary of War Application November 16, 1944, Serial No. 563,736

24 Claims. (Cl. 60—35.6)

(Granted under the act of March 3, 1883, as
amended April 30, 1928; 370 O. G. 757)

The invention described herein may be manufactured and used by or for the Government for governmental purposes without the payment to me of any royalty thereon.

This invention relates to rocket projectiles and particularly to traps utilized to retain propellents within the combustion chamber of the rocket projectile.

One of the well recognized difficulties encountered in rocket projectiles utilizing sticks of powder as a propellent, was the retention of the sticks of powder within the rocket motor combustion chamber until all of the powder was substantially consumed in combustion.

The following factors contributed to the difficulties encountered: first, a high inertia force is produced on the propellent due to the initial rapid acceleration of the rocket projectile. Such force naturally tends to discharge the propellent out of the rear of the projectile; secondly, the high velocity turbulent flow of gases generated by the combustion of the propellent tends to carry the propellent out of the combustion chamber; thirdly, a trap which is effective in retaining small pieces of the propellent within the motor chamber is generally found to offer too much resistance to the flow of gases out of the chamber, hence permitting dangerous build up of pressure within the chamber.

Accordingly it is an object of this invention to provide improved traps for propellent of a rocket projectile.

A particular object of this invention is to provide traps for the propellent of a rocket projectile comprising longitudinal sticks or rods of powder.

Another object of this invention is to provide an efficient trap for the propellent of a rocket projectile wherein the trap member is of generally cylindrical shape, hence readily adaptable to large quantity manufacture.

The specific nature of the invention as well as other objects and advantages thereof will clearly appear from a description of a preferred embodiment as shown in the accompanying drawing in which:

Fig. 1 is a longitudinal sectional view of a rocket projectile including a trap construction embodying this invention, comprising a cylindrical perforated member secured to the nozzle of the rocket motor.

Fig. 2 is a view similar to Fig. 1 showing a modification of the trap member wherein slotlike perforations are provided in the trap.

Fig. 3 is a view similar to Fig. 1 embodying a still further modification of this invention wherein a trap member is secured to the forward wall of the rocket motor chamber.

Fig. 4 is a sectional view of Fig. 3 taken along the plane 4—4.

Fig. 5 is a view similar to Fig. 3 of a rocket motor construction in accordance with this invention but utilizing a still further modified trap member.

Fig. 6 is a longitudinal sectional view of a rocket motor embodying the principles of this invention wherein a single tubular element serves as both a trap and the nozzle for the rocket motor.

Referring to Fig. 1 there is shown in assembled relation a rocket motor for a rocket projectile comprising a suitable hollow cylindrical housing 1. The forward end of housing 1 is closed to define a rearwardly opening combustion chamber 2. The closure of the forward end of housing 1 is shown to be accomplished by a loading plug member 9 threadably secured to the housing 1. However, such closure could obviously be accomplished by an integral portion of housing 1. An annular nozzle adapter 6 is threadably secured to the rear end of housing 1 and a nozzle member 3 is in turn secured to nozzle adapter 6 by means of a plurality of bolts 4. Nozzle member 3 is hollow and the hollow portion thereof defines a Venturi exhaust passage 5. Nozzle member 3 is provided with a threaded forward projection 7 of smaller diameter than the interior of nozzle adapter 6. A trap 18 comprising a tubular member having interior threads 25 at its rear end is thereby threadably secured to portion 7 of nozzle member 3. Trap member is of substantially smaller diameter than the interior diameter of combustion chamber 2 and hence an annular space is defined between the trap member 18 and between interior wall of combustion chamber 2. A plurality of spaced radial holes 19 are provided in trap member 18.

A powder charge 20 is loaded into the rocket motor in the space between trap member 18 and the walls of combustion chamber 2. Powder charge 20 preferably comprises a plurality of long cylindrical powder sticks which are disposed loosely around trap member 18 and lie substantially parallel to the axis of housing 1. Such powder sticks may be conveniently loaded into combustion chamber 2 by removal of the loading plug member 9 from the forward end of chamber 2. An igniting element 21, preferably comprising an electrical squib, is mounted within the interior of trap member 18. A blowout type sealing disk 22 may be provided positioned across the forward end of the exhaust nozzle 5, and the igniting element 21 may be conveniently positioned against such disk.

In the event that the design of a particular rocket requires greater area for passage of the gases developed thru the trap member 18 than that available thru the holes 19, the construction shown in Fig. 2 may be utilized. In place of circular perforations 19, a plurality of slotlike perforations 23 are provided in the trap 18 providing a substantial increase in exhaust passage area without decreasing the efficiency of the trap in retaining the powder charge within the combustion chamber until it is substantially consumed.

In the modification described in Fig. 3 there is again provided a hollow housing 1 closed at its forward end by a loading plug member 9 threadably inserted therein. A hollow nozzle member 3, defining a Venturi exhaust nozzle 5, is threadably secured to the rear end of housing 1. A trap member 18, having a plurality of slot-like perforations 19, similar to those shown in Fig. 2, is concentrically mounted within the combustion chamber 2 defined by housing 1 by means of a coupling 24 which threadably engages the forward portion of trap 18 and is in turn screwed into the forward wall of combustion chamber 2, which here comprises a loading plug member 9. An igniting element 21 is placed within combustion chamber 2 and a sealing disk 22 may be provided across the forward end of the nozzle opening 5.

This construction offers a further advantage over the constructions heretofore described in that the forward suspension of the trap member provides considerably greater exhaust passage area for the gases to develop. The increase in exhaust passage area is sufficient so that it is possible to utilize a trap member constructed as shown in Fig. 5 wherein the trap member 35 comprises a solid cup-shaped member, the base of which is secured to the forward wall of combustion chamber 2 by suitable bolts 36.

A still further modification of this invention is disclosed in Fig. 6 wherein a special nozzle member 7a it utilized as a trap. Here again a tubular housing 1 is provided having a combustion chamber 2 defined between loading plug 9 threadably inserted in its forward end and an annular nozzle adapter threadably secured to its rear end. A nozzle member 7a is provided comprising a tapering tubular member having an annular nozzle flange 8 secured to its periphery intermediate its ends as by welding. Nozzle flange 8 is in turn secured to the nozzle adapter 6 by bolts 4. Nozzle member 7a is thus supported concentrically with respect to the combustion chamber 2 defined by housing 1 and the smaller diameter end of nozzle member 7a projects forwardly well into combustion chamber 2. An annular space is thereby defined between nozzle member 7a and the interior walls of combustion chamber 2. A plurality of long cylindrical powder sticks 20 are loosely loaded into the space between the walls of combustion chamber 2 and nozzle member 7a. An electric squib igniting element 21 is provided within combustion chamber 2 and is preferably mounted against one face of a blowout type sealing disk 22 which is mounted across the forward end of nozzle member 7a. The effectiveness of this particular modification in retaining all but very small pieces of powder in the combustion chamber is obvious.

It is apparent that the described modifications constitute simple, readily manufacturable structures which positively contain the propellent within the combustion chamber until the powder is substantially consumed. Such trap elements, however, do not impair the flow of gasses developed within such chamber and the inertia forces due to the acceleration of the projectile have no tearing or otherwise destructive action on the propellent charge.

I claim:

1. A rocket comprising a cylindrical combustion chamber having a rearwardly disposed coaxial opening and a nozzle coaxially aligned with the opening of said chamber, a detachable cylindrical hollow trap member in said combustion chamber and coaxial therewith, said trap member being of substantially smaller diametrical dimension than said combustion chamber to define an annular space between said trap member and said chamber, a propellant charge consisting of a plurality of elongated powder sticks mounted in said annular space in substantially parallel relationship to the axis of said chamber, first means in said trap member for providing free access to propellant gases produced by combustion of said powder sticks between said annular space and the hollow interior of said trap member, and second means for providing free access to said propellant gases between the hollow interior of said trap member and said nozzle.

2. The combination defined in claim 1 wherein said access means comprises a plurality of spaced radial perforations in said hollow cylindrical member.

3. A rocket motor comprising in combination, a tubular housing open at the rear and closed at its forward end, a tubular nozzle member detachably secured intermediate the ends thereof to the rear portion of said housing and coaxial therewith, said tubular nozzle member having a portion only thereof projecting forwardly within said housing, said portion arranged and constructed to provide an annular space between said member and said housing and to provide free access of propellent gases between said space and the interior of the nozzle and a propellant charge mounted in the said annular space.

4. The combination defined in claim 3 wherein said nozzle member comprises a tapering tubular element arranged with its smaller diameter portion projecting into said housing and a blowout sealing disk covering the forward end of said nozzle member.

5. The combination defined in claim 3 wherein said powder charge comprises a plurality of cylindrical powder sticks spaced about the periphery of said nozzle member and substantially parallel to the axis of said housing.

6. A rocket motor comprising in combination, a tubular housing open at the rear and closed at its forward end to form a combustion chamber, a nozzle member having a longitudinal gas passage there-thru and an annular mounting flange secured thereto intermediate its ends, means for detachably securing said flange to the rear of said housing in substantial coaxial alignment with said open end whereby a portion of said nozzle member projects forwardly within said housing and a propellent charge mounted in the space between the exterior surface of said nozzle member and the adjacent interior wall of said housing.

7. A rocket motor comprising in combination, a cylindrical housing having a rearwardly opening axial chamber therein, a radially apertured cylindrical trap member of substantially smaller diameter than said chamber secured to the forward end wall of said chamber and extending rearwardly thru said chamber in axial alignment therewith, whereby an annular space is defined between said trap member and the walls of said chamber, a propellent charge mounted in said annular space, and a nozzle member secured to the rear end of said housing and defining a constricted axial exhaust passage whereby said powder charge is retained in said chamber until substantially consumed by combustion.

8. A rocket comprising a cylindrical combustion chamber having a rearwardly disposed coaxial opening, detachable means forming a hollow trap member of circular cross section within said chamber and a nozzle in substantial coaxial alignment with the axis of said cylindrical chamber, said means being at least in part of smaller diametrical dimension than said combustion chamber thereby forming an annular space between said chamber and said trap member, a propellant charge consisting of a plurality of single grain, elongated powder sticks disposed within said annular space, and means providing free access to the propellant gases produced by combustion of said powder sticks between said annular space and the hollow interior of said trap member.

9. A rocket comprising a cylindrical combustion chamber having a rearwardly disposed coaxial opening, a detachable, cylindrical hollow trap member in said combustion chamber, means for supporting said trap member in said combustion chamber in coaxial alignment therewith, said trap member being of substantially smaller diametrical dimension than said combustion chamber to define an annular space between said chamber and said trap member, a nozzle, means for operatively attaching said nozzle to said chamber at said rearwardly disposed opening in coaxial alignment therewith, a propellant charge consisting of a plurality of single grain, elongated powder sticks in said annular space, and communicating passages in said trap member for providing free access to propellant gases produced by combustion of said powder sticks between said annular space and the hollow interior of said trap member.

10. A rocket motor component comprising a cylindrical combustion chamber having a rearwardly disposed coaxial opening and a closed forward end, a detachable trap member of circular cross section, means for mounting said trap member within said chamber in coaxial alignment therewith, said trap member being of smaller diametrical dimension than said combustion chamber thereby defining an annular space between said chamber and said trap member, a propellant charge consisting of a plurality of single grain, elongated powder sticks mounted in said annular space, and means for providing free access to propellant gases produced by combustion of said powder sticks between said annular space and the hollow interior of said trap member.

11. The rocket motor according to claim 10 wherein said last named means comprises a plurality of spaced radial roles.

12. The rocket motor according to claim 11 further comprising a nozzle detachably secured to said rearwardly disposed opening in coaxial alignment therewith.

13. The rocket motor according to claim 10 wherein said trap member is tapered and extends beyond said rearwardly disposed opening to effectively constitute a nozzle.

14. The rocket according to claim 10 wherein said trap member is affixed to said closed forward end.

15. A rocket comprising a cylindrical combustion chamber having a closed forward end and a rearwardly disposed coaxial opening, detachable means defining a hollow trap member of circular cross section within said chamber and a nozzle at said rearwardly disposed opening, said trap member forming an annular space between said chamber and said trap member, further means for retaining said first-mentioned means in substantial coaxial alignment with said chamber, a propellant charge consisting of single grain, elongated powder sticks disposed within said annular space, and means providing free access to propellant gases produced by combustion of said powder sticks between said annular space and the hollow interior of said first-mentioned means.

16. The rocket according to claim 15 wherein said detachable means consist of two separate elements.

17. The rocket according to claim 16 wherein said trap member is affixed to said closed forward end.

18. The rocket according to claim 15 wherein said last-mentioned means comprises a plurality of radial holes.

19. The rocket according to claim 18 wherein said detachable means consists of two separate elements.

20. The rocket according to claim 15 wherein said closed forward end consists of a threadably secured loading plug.

21. The rocket according to claim 20 wherein said detachable means constituting said trap member and said nozzle consists of a single element having a flange member affixed intermediate its ends.

22. The rocket according to claim 15 wherein said detachable means consist of a single element.

23. A rocket motor for use with a propellant consisting of elongated powder sticks comprising a hollow cylindrical combustion chamber having a rearwardly disposed coaxial opening, detachable plug means secured to the forward end of said chamber to effectively provide a closure thereof, detachable means secured to said housing in coaxial alignment therewith forming a trap member within said chamber and a nozzle at said rearwardly disposed coaxial opening, said trap member forming an annular space between the inside walls of said chamber and said trap member to receive said elongated powder sticks, and means providing free access to propellant gases produced by combustion of said powder sticks between said annular space and the hollow interior of said nozzle.

24. The rocket according to claim 23 wherein said detachable means consists of two separate elements.

CLARENCE N. HICKMAN.

REFERENCES CITED

The following references are of record in the file of this patent:

UNITED STATES PATENTS

| Number | Name | Date |
| --- | --- | --- |
| 249,192 | Mallory | Nov. 8, 1881 |
| 266,437 | Cunningham | Oct. 24, 1882 |
| 1,360,602 | Van Deuren | Nov. 30, 1920 |
| 1,611,353 | Lepinte | Dec. 21, 1926 |
| 1,879,579 | Stolfa et al. | Sept. 27, 1932 |
| 2,043,268 | Skinner | June 9, 1936 |
| 2,440,305 | Skinner | Apr. 27, 1948 |

FOREIGN PATENTS

| Number | Country | Date |
| --- | --- | --- |
| 129,701 | Great Britain | July 24, 1919 |
| 305,133 | Germany | Dec. 30, 1919 |